(12) United States Patent
Aerts (10) Patent No.: US 9,360,913 B2
(45) Date of Patent: Jun. 7, 2016

(54) METHOD OF PROVIDING A CLOCK FREQUENCY FOR A PROCESSOR

(75) Inventor: Steven Aerts, Oud-Heverlee (BE)

(73) Assignee: NXP B.V., Eindhoven (NL)

( * ) Notice: Subject to any disclaimer, the term of this patent is extended or adjusted under 35 U.S.C. 154(b) by 986 days.

(21) Appl. No.: 12/304,327

(22) PCT Filed: Jun. 6, 2007

(86) PCT No.: PCT/IB2007/052130
§ 371 (c)(1),
(2), (4) Date: Dec. 11, 2008

(87) PCT Pub. No.: WO2007/144808
PCT Pub. Date: Dec. 21, 2007

(65) Prior Publication Data
US 2009/0327791 A1    Dec. 31, 2009

(30) Foreign Application Priority Data

Jun. 15, 2006    (EP) .................................... 06115537

(51) Int. Cl.
| | |
|---|---|
| G06F 1/12 | (2006.01) |
| G06F 1/04 | (2006.01) |
| G06F 1/32 | (2006.01) |
| G06F 1/08 | (2006.01) |
| H04R 25/00 | (2006.01) |

(52) U.S. Cl.
CPC ................ *G06F 1/3203* (2013.01); *G06F 1/04* (2013.01); *G06F 1/08* (2013.01); *G06F 1/12* (2013.01); *G06F 1/324* (2013.01); *H04R 25/505* (2013.01); *H04R 2460/03* (2013.01); *Y02B 60/1217* (2013.01); *Y02B 60/32* (2013.01)

(58) Field of Classification Search
USPC .......................... 713/400, 401, 501, 503, 600
See application file for complete search history.

(56) References Cited

U.S. PATENT DOCUMENTS

| | | | | |
|---|---|---|---|---|
| 5,598,158 | A * | 1/1997 | Linz ............................. | 341/143 |
| 5,719,528 | A * | 2/1998 | Rasmussen et al. ............ | 330/10 |
| 5,808,494 | A | 9/1998 | Chang et al. | |
| 5,815,102 | A * | 9/1998 | Melanson ..................... | 341/143 |
| 5,986,512 | A * | 11/1999 | Eriksson ......................... | 331/16 |
| 6,002,273 | A * | 12/1999 | Humphreys ..................... | 327/3 |
| 6,061,804 | A * | 5/2000 | Hirai ............................. | 713/501 |

(Continued)

FOREIGN PATENT DOCUMENTS

| | | |
|---|---|---|
| CN | 1 117 606 A | 2/1996 |
| WO | 2005124516 A2 | 12/2005 |

*Primary Examiner* — Khanh Dang (57) ABSTRACT

A method of providing a clock frequency to a processor is described. The method in accordance with the invention comprises the step of providing at least one reference signal and the step of determining a control value which relates to a desired first frequency. A second signal that relates to the control value is then used in a subsequent step as an input signal for a noise shaper. Then, a first signal which has the first frequency is generated by combining the output of the noise shaper with one of the at least one reference signals. The first signal is used as a clock frequency of the processor. In a preferred embodiment, one reference signal with a fixed reference frequency is provided. The reference signal is gated or enabled and hold by the output signal provided by a 1-bit noise shaper, whereby the first frequency is generated which is then used as processor clock frequency. The method in accordance with the invention is particularly advantageous as it allows for the control of the processor's clock frequency via the second signal that is fed into the noise shaper.

20 Claims, 8 Drawing Sheets

(56) References Cited

U.S. PATENT DOCUMENTS

| | | | |
|---|---|---|---|
| 6,396,313 B1* | 5/2002 | Sheen | 327/105 |
| 6,697,000 B2* | 2/2004 | LeReverend et al. | 341/143 |
| 7,142,144 B1* | 11/2006 | Farooqi et al. | 341/143 |
| 7,630,504 B2* | 12/2009 | Poulsen | 381/111 |
| 7,711,966 B2* | 5/2010 | Prabhakaran et al. | 713/300 |
| 2005/0218871 A1 | 10/2005 | Kang et al. | |
| 2006/0047987 A1* | 3/2006 | Prabhakaran et al. | 713/322 |
| 2009/0230769 A1* | 9/2009 | Aerts | 307/32 |

\* cited by examiner

METHOD OF PROVIDING A CLOCK FREQUENCY FOR A PROCESSOR

The invention relates to a method of providing a clock frequency for a processor by use of a noise shaper, to an electronic apparatus and to a computer program products for controlling the load and the idle time of the processor.

A processor usually relies on a synchronization signal by which the processes carried out by the processor are triggered. Processors are thus designed and operated on assumptions about a synchronization signal. This signal, known as a clock signal, is usually of the form of a periodic square wave. The processor clock frequency as provided by the clock signal has an impact on the instantaneous processor load. If the processor is for example run at a relative high clock frequency, the processor load can alternate between a relative high processor load and a relative low processor load. The period of time during which the processor load is relatively low refers to the time when the processor is inactive or when the processor processes background tasks. This period of time is referred to as idle time or as idle cycle.

A sequence of idle cycles and of active cycles is referred to as paced loops. Paced loops can cause disturbances on the processor and should therefore be avoided. Idle periods can be reduced by a change of the processor's clock frequency. If the processor is run at a lower frequency, then the processor load will not reach the high processor load as before, but the idle time of the processor will decrease. Thus, the processor can be active or inactive during certain periods of time, whereby the lengths of the active and inactive cycles depend on the clock frequency.

Processor clock frequencies are typically determined by integer division of a higher clock which is provided by a reference signal. This either requires a quite high clock frequency which may not be available or otherwise the accuracy of the processor clock frequency that is obtained by a division of the higher clock frequency may not be sufficient for the intended purpose. With only coarse frequency control, the processor would be active and inactive during longer periods of time which may not be desirable.

The document WO2005/124516 A2 discloses a method and a circuit arrangement for controlling the performance of an integrated circuit in response to a monitored performance indicator, wherein power supply of the integrated circuit is controlled based on the performance indicator. At least one of a noise level of the controlled power supply in the clock frequency generated in the integrated circuit is monitored and the respective control signal is fed back to the controlling function if the checking result is not within a predetermined range. Thereby a control loop is responsible for the control of the clock frequency. The control loop is adapted to check whether the controlled clock frequency is slow enough to enable a correct performance or work of the system. This is achieved by means of a clock comparing function which compares a clock high pulse with a reference pulse synchronous to a clock pulse having a delay equal to half of the worst case path delay in the system. A disadvantage of the proposed method and circuit arrangement however is that a fairly complex control loop is required for ensuring that the generated clock frequency is slow enough to enable correct performance or work of the system.

There is therefore a need for an improved method of providing a clock frequency to a processor, for an improved electronic apparatus for providing a clock frequency to a process, and for an improved computer program products for controlling the loads and the idle time of the processor.

In accordance with an embodiment of the invention, there is provided a method of providing a clock frequency to a processor. The method comprises the step of providing at least one reference signal. In a further step, a control value is determined which relates to a desired first frequency. A second signal that relates to the control value is then used in a subsequent step as an input signal for a noise shaper. Then, a first signal which has the first frequency is generated by combining the output of the noise shaper with one of the at least one reference signals. The first signal is used as a clock frequency of the processor.

Each of the at least one reference signals has a different reference frequency. The first frequency equals either to one of the reference frequencies or to a fraction of one of the reference frequencies. Thus, with relative simple means a clock frequency which is derived from a reference frequency can be provided.

The first frequency is generated by use of the second signal. The second signal relates to a control value. Thus, the first frequency can be varied by a change of the control value. The method in accordance with the invention is particularly advantageous as it allows for the provision of a processor clock frequency that can be adapted by the control value.

In accordance with an embodiment of the invention, one reference signal with a reference frequency is provided, wherein the control value corresponds to the ratio of the desired first frequency and said reference frequency.

In accordance with an embodiment of the invention, the noise shaper is a noise shaper that provides at its output a 1-bit bit stream. The 1-bit bit stream is a sequence of logical "0"-bits and logical "1"-bits. The average value of the sequence of bits in the bit stream corresponds to the control value. Thus, for the case when a single reference signal is provided, the first frequency of the first signal is proportional to the reference frequency and the control value.

In accordance with an embodiment of the invention, the output signal of the noise shaper is used to enable and to hold the reference signal, whereby the first signal is generated. The output of the noise shaper is a 1-bit bit stream. The method in accordance with the invention is particularly advantageous as it allows to generate a first frequency that is at a desired value from a reference frequency which can be seen as a high clock frequency so that the processor can be clocked by the first frequency. By proper choice of the first frequency, the processor's idle times can be kept relatively small.

In accordance with an embodiment of the invention, the first signal is generated by gating the reference signal with the output signal of the noise shaper. The reference signal is therefore combined with the output signal of the noise shaper in the sense that the reference signal is gated with the output signal, whereby as a result the first signal is generated.

In accordance with an embodiment of the invention, the method further comprises the step of determining an actual load of the processor and the step of determining the control value from the deviation of the actual load to a preset target processor load. The actual processor load depends on the processor's clock frequency. Thus by adapting the first frequency, the load of the processor can be varied and according to this embodiment controlled in a way so that it is set to a preset target value.

In accordance with an embodiment of the invention, the method further comprises the step of determining the idle time of the processor, the step of decreasing the control value if the idle time is larger than a first threshold value and the step of increasing the control value if the idle time is smaller than a second threshold value, whereby the control value is increased or decreased until the idle time lies between the first and the second threshold value. The processor's idle times can be measured and if the idle time lies outside the range that is given by the interval between the first threshold value and the second threshold value, then the first frequency that is used as a processor clock frequency can be adapted by a change of the control value which causes a change of the second signal so that the processor idle time is in the range between the first and the second threshold value.

The method in accordance with the invention is particularly advantageous as it allows to control the idle time of the processor by adjusting the first frequency that is used as the processor's clock frequency.

In accordance with an embodiment of the invention, the idle time of the processor is determined by taking the average of the idle times of subsequent processor cycles, wherein the idle times have been measured before.

In accordance with an embodiment of the invention, the first frequency or the reference frequency is used as a processor clock frequency. In some cases it is advantageous to use the reference frequency that is at a higher rate than the first frequency directly as a processor clock frequency. An example of such a case is for example when the processor communicates with a peripheral device which requires immediate response from the processor within the same cycle.

In accordance with an embodiment of the invention, the processor is connected through a processor bus to a peripheral device, wherein the reference frequency is used when the peripheral device and the processor communicate with each other via the processor bus.

In accordance with an embodiment of the invention, the noise shaper is a first order noise shaper or a higher order noise shaper.

In accordance with an embodiment of the invention, the input range of the noise shaper is between a first input value and a second input value, wherein the first input value is larger than the second input value, wherein the second signal is set to a value which is at least approximately equal to the sum of the second input value and the product of the difference between the first and the second input value and the control value. The input range of a noise shaper is usually divided in for example 256 steps between the first input value and the second input value. The output can therefore be controlled in steps of 1/256 in a range of 1/256 and 256/256 within the first and the second input values. The noise shaper output is a 1-bit bit stream, e.g. a sequence of ones and zeros, such that the average value equals the specified input value.

In accordance with an embodiment of the invention, the method is employed in low and ultra low power systems such as hearing devices or hearing aids. The method in accordance with the invention is furthermore applied to clock synchronous communication interfaces which are adjusted dynamically according to traffic occurring on the interface. For ultra low power systems, power consumed at interfaces due to relatively high load capacitance can be quite significant, especially for clock signals. The method in accordance with the invention is particularly advantageous as it allows to control the processor load and therefore can be employed by an ultra low power system in order to save the available energy of a power supply, e.g. a battery, that powers the system.

In accordance with an embodiment of the invention, the noise shaper provides a multi-bit bit stream with a first number of different values, wherein the first number of reference signals is provided, wherein each reference signal of the first number of reference signals has a different reference frequency, wherein each reference frequency is assigned to one of the different bit values, wherein the first signal is generated by selecting the reference frequency according to the bit value given by the output signal of the noise shaper. Thus a first number of reference signals with different reference frequencies is provided, whereby the first number corresponds also to the number of different bit values that are provided by the output of the noise shaper. The output signal of the noise shaper can for example be provided to a multiplexer in which the various reference signals are used as an input. The multiplexer selects the corresponding reference signal based on the output signal of the noise shaper. The multiplexer can then provide the selected reference signal to the processor.

In another aspect, the invention relates to an electronic apparatus for providing a clock frequency to a processor, wherein the electronic apparatus comprises means for providing at least one reference signal and means for determining a control value, wherein the control value relates to a desired first frequency. The electronic apparatus further comprises means for using a second signal as input signal for a noise shaper, wherein the second signal relates to the control value and means for generating a first signal having the first frequency by combing the output of said noise shaper with one of the at least one reference signals. The electronic apparatus further comprises a processor and means for using said first frequency as clock frequency for said processor.

In accordance with an embodiment of the invention, the electronic apparatus is a component of a low power system such as hearing devices or hearing aids. The electronic apparatus can be employed in these devices for controlling and spreading processor activity whilst keeping balanced active/inactive duty cycles and minimizing paced loops, which would otherwise cause audible distortions.

In another aspect, the invention relates to a computer program product that comprises computer executable instructions, wherein the instructions are adapted to performing the steps of determining an idle time of a processor, wherein the processor is clocked by a first frequency of a first signal, wherein the first signal is generated by a noise shaper, wherein a feed-back loop of the noise shaper is supplied with a reference signal having a reference frequency, and wherein the input of the noise shaper is supplied with a second signal relating to a control value, wherein the control value corresponds to the ratio of the first frequency and the reference frequency. The instructions are further adapted to performing the step of decreasing the control value if the idle time is larger than the first threshold value and the step of increasing the control value if the idle time is smaller than the second threshold value, whereby the control value is increased or decreased until the idle time is in the range between the first and the second threshold value. These and other aspects of the invention will become even more apparent from and elucidated with reference to the embodiments described hereinafter.

In the following preferred embodiments of the invention will be described in greater detail by way of example only making reference to the drawings in which:

FIG. 1 shows a block diagram of an electronic apparatus 100 which comprises a noise shaper 102, a signal generator 104, a frequency generator 106, a microprocessor 108, and a clock gating component 126.

Figure 1:
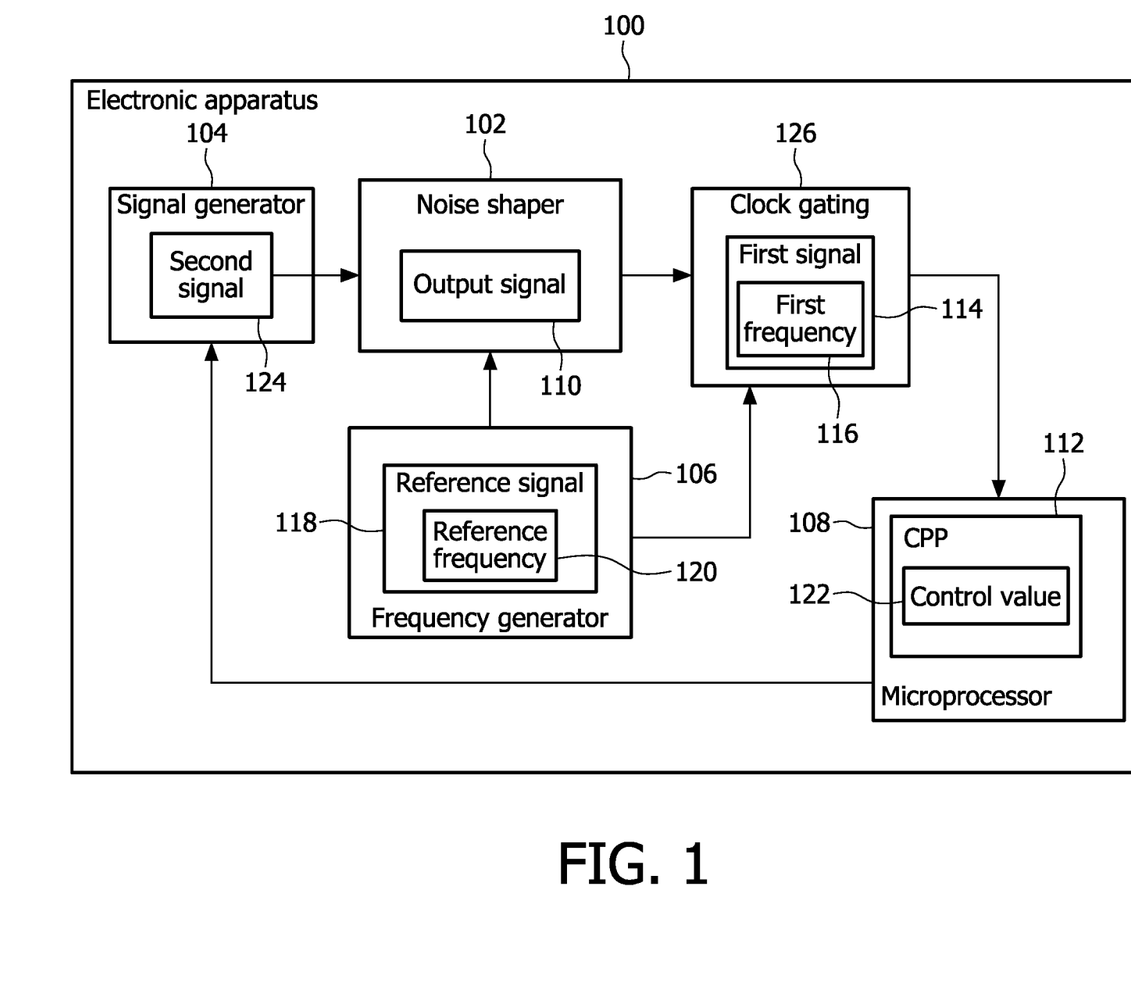
FIG. 1 shows a block diagram of an electronic apparatus.

The frequency generator 106 provides a reference signal 118 that is at a reference frequency 120. The reference signal 118 is for example a periodic square wave signal with a period that corresponds to the inverse of the reference frequency 120. The reference signal 118 is used as operating frequency of the noise shaper 102.

The signal generator 104 provides a second signal 124 which is used as an input signal for the noise shaper 102. The second signal 124 is a digital signal which is within the input range of the noise shaper 102. The noise shaper 102 generates an output signal 110.

In the example described here, the noise shaper 102 is assumed to be a 1-bit noise shaper. Thus, the output signal 110 corresponds to a sequence of logical "1" and logical "0" bits with an average that reflects the value of the second signal 124. The output signal 110 is used as an input signal for the clock gating component 126. The clock gating component 126 is further provided with the reference signal 118. The clock gating component 126 gates the reference signal 118 according to the sequence of logical "0" and logical "1"-bits in the output signal 110, whereby a first signal 114 with a first frequency 116 is generated. The first frequency 116 is then used as a clock frequency of the processor 108.

In an extension to the embodiment described so far in FIG. 1, the first frequency 116 can be adjusted by the microprocessor so that the microprocessor load corresponds to a target load. The microprocessor 108 therefore executes a computer program product 112 which is loaded from a permanent storage device (not shown in FIG. 1) into the microprocessor 108, e.g., after the electronic apparatus has been switched on. An actual load of the processor 108 is determined via the computer program product 112. The actual load is then compared with the target processor load. The processor load depends on the current clock frequency. The processor load is approximately antiproportional to the clock frequency. Thus by determining the deviation of the actual load to the target processor load, the required change of the clock frequency can be determined. The desired first frequency relates to a new control value which is then determined by the computer program 122. The second signal 124 can be adjusted via the computer program product 122. Thus, it can be adjusted so that it relates to the control value 122. Due to the adjustment of the second signal 124, the first signal 124 changes accordingly so that it matches the desired first frequency.

Figure 2:
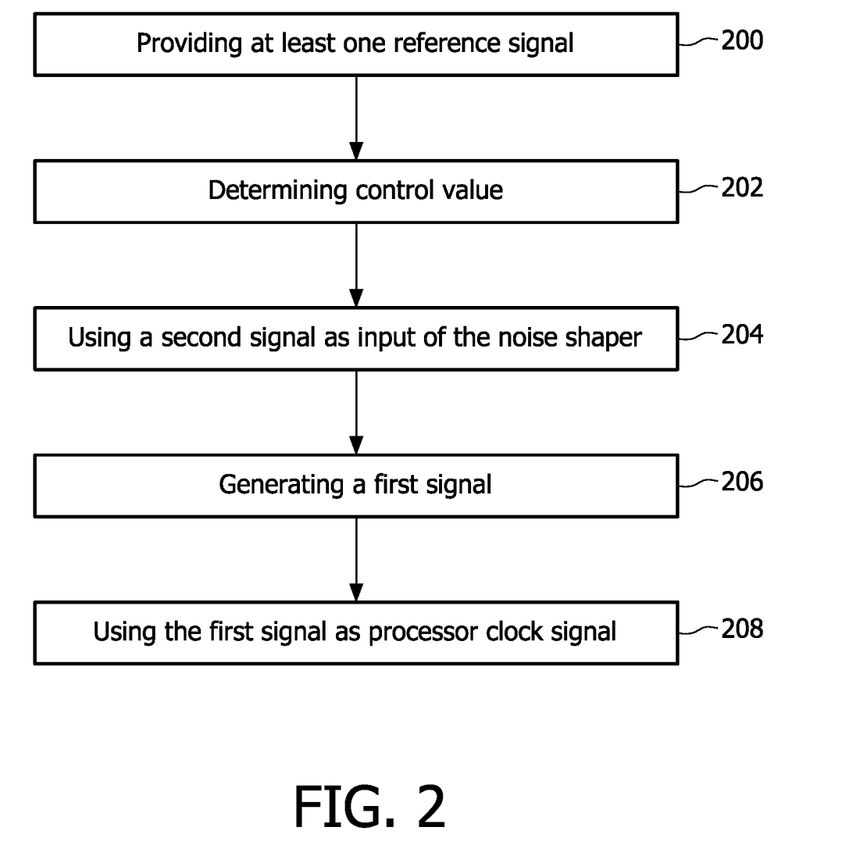
FIG. 2 shows a flow diagram illustrating the basic steps performed by the method in accordance with the invention.

FIG. 2 shows a flow diagram illustrating the basic steps performed by the method in accordance with the invention. In step 200, at least one reference signal is provided. In step 202, a control value is determined which relates to a desired first frequency. In step 204, a second signal is used as input signal for a noise shaper, wherein the second signal relates to the control value. In step 206, a first signal is generated which is at a first frequency by combining the output of the noise shaper with one of the at least one reference signals. In step 208, the first frequency is provided as a clock frequency for the processor.

Figure 3:
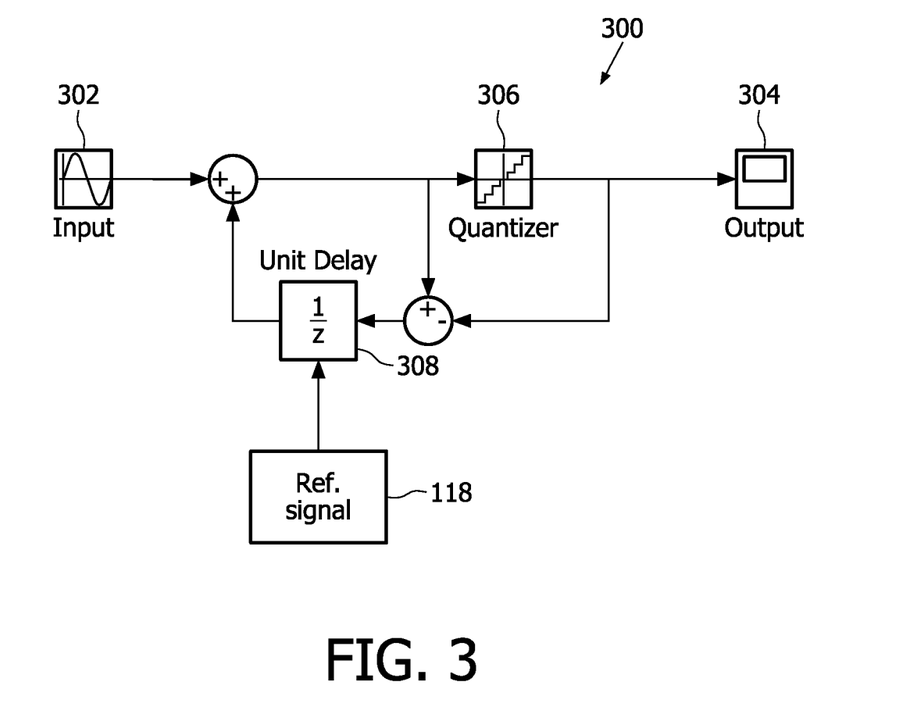
FIG. 3 shows a block diagram of a noise shaper.

FIG. 3 shows a block diagram of a first order noise shaper 300. The noise shaper 300 comprises an input 302, an output 304, a quantizer 306 and a feed-back loop 308. The reference signal 118 is fed into the noise shaper 300 via the feed back-loop 308 which is therefore the operating frequency of the noise shaper 300. The input 302 of the noise shaper is supplied with the second signal which relates to the control value. The second signal corresponds to a digital value that is within the input range of the noise shaper 300. The input range of the noise shaper is typically between a first input value and a second input value (first input value>second input value). The magnitude of the second signal is set so that it is at least approximately equal to the sum of the second input value A and the product of the difference between the first input value B and the second input value and the control value C: D=A+ C(B−A). If for example, the input range of the noise shaper is between 0 and 255 and the control value corresponds to 0.5, then the second signal is set to 128. The first signal is obtained at the output 304 of the noise shaper. The noise shaper outputs a 1-bit bit stream (a sequence of zeros and ones) that reflects the average value of the input. The output of the noise shaper can be used to gate or to hold and enable the reference signal, whereby a first signal with a first frequency is generated that can be used as a clock frequency of a processor.

Figure 4:
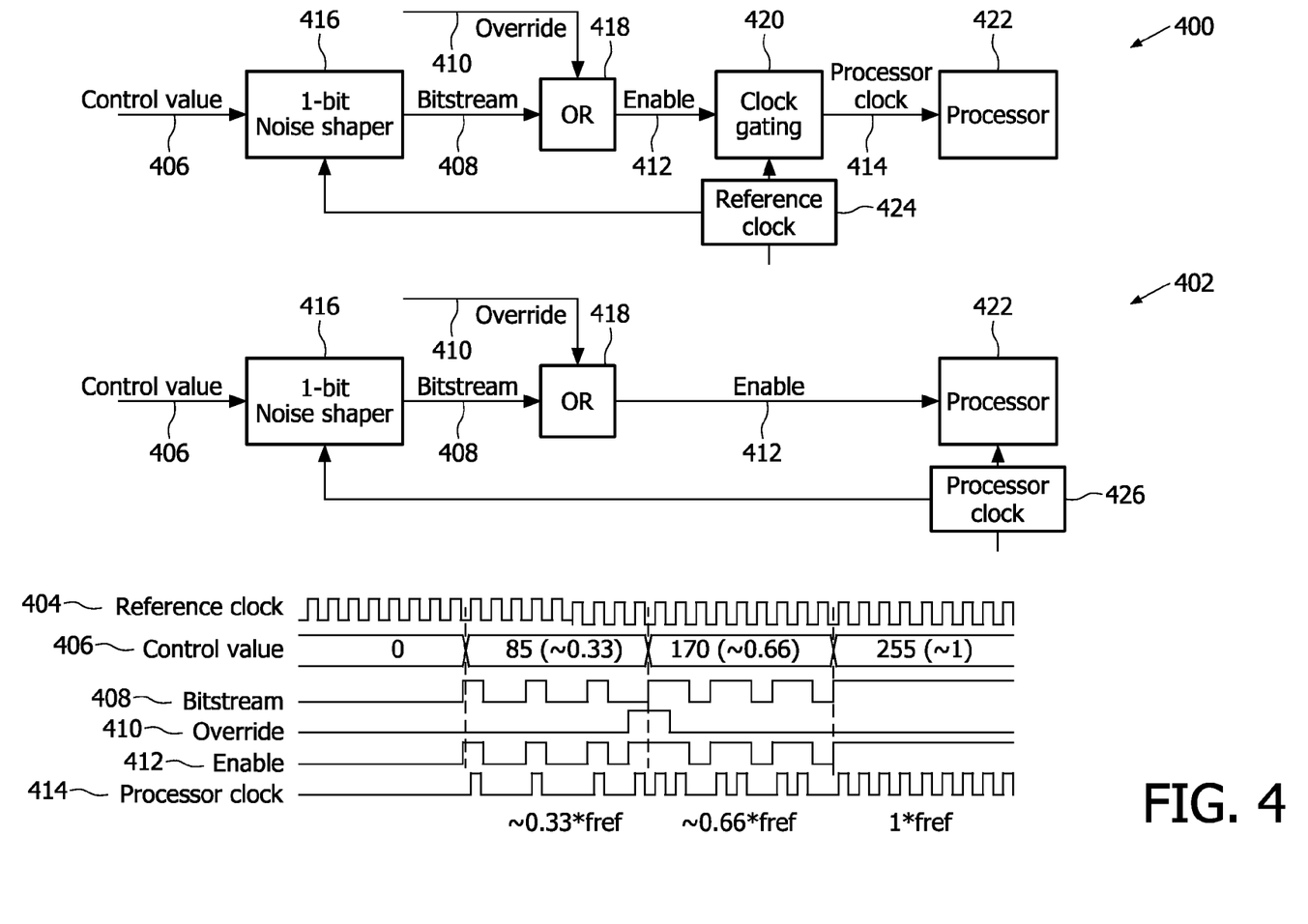
FIG. 4 shows block diagrams of two electronic apparatuses and graphs of various signals fed into or generated by the apparatuses.

FIG. 4 shows block diagrams of two electronic apparatuses 400 and 402 and graphs of various signals: a reference signal 404, a control value 406, a bit stream 408, an override signal 410, an enabling signal 412, and a processor clock signal 414 that are fed into the apparatuses 400 or 402 or that are generated by apparatuses 400 or 402.

The apparatus 400 comprises a 1-bit noise shaper 416, a logical OR-Gate 418, a clock gating component 420, a processor 422, and a reference clock 424. The apparatus 402 comprises the 1-bit noise shaper 416, the logical OR-Gate 418, the processor 422, and a processor clock 426. The reference clock 424 and the processor clock 426 provide the reference signal 404. The apparatuses 400 and 402 are thus different with respect to the clock gating component 420.

As can be seen, the reference signal 404 is a square wave signal. The reference signal is fed into the noise shaper 416 of the apparatus 400. The second signal that reflects the control value 406 is provided furthermore to the input of the noise shaper 416. The control value 406 equals to 0, 85, 170, or 255, which corresponds to 0%, 33%, 66% or 100% of the maximal input of the noise shaper. The noise shaper 416 outputs the bitstream 408, whose distribution is depicted so that it reflects the corresponding control values of 0, 85, 170 or 255. The bit stream 408 is fed into the logical Override gate 418 which might be used in order to override the bit stream by use of the override signal 410. At the output of the Override gate 418, the enabling signal 412 is generated. The depiction of the enabling signal 412 also reflects the various control values 406. As can be seen, the enabling signal 412 corresponds to the bitstream 410 as long as the override 410 is at a zero value, whereas it corresponds to the override 410 when the override 410 is at one. The enabling signal 412 is passed onto the clock gating component 420 which receives also the reference signal 404. The enabling signal 412 is used by the clock gating component 402 to gate the reference signal 404, whereby the processor clock signal 414 (which corresponds to the first signal) is generated. The depiction of the processor clock signal 414 also reflects the various control values.

The reference signal is also fed into the noise shaper 416 of the apparatus 402. The second signal that reflects the control value 406 is provided furthermore to the input of the noise shaper 416. The control value 406 equals again to 0, 85, 170, or 255, which corresponds to 0%, 33%, 66% or 100% of the maximal input of the noise shaper. The noise shaper 416 outputs the bitstream 408 whose distribution is depicted so that it reflects the corresponding control values of 0, 85, 170 or 255. The bit stream 408 is fed into the logical Override gate 418 which might be used in order to override the bit stream 408 by use of the override signal 410. At the output of the Override gate 418, the enabling signal 412 is generated. As can be seen, the enabling signal 412 corresponds to the bitstream 410 as long as the override 410 is at a zero value, whereas it corresponds to the override 410 when the override 410 is at one. The enabling signal 412 is used to enable and hold the reference signal, whereby as a result the processor 422 is clocked by the processor clock signal 414.

Figure 5:
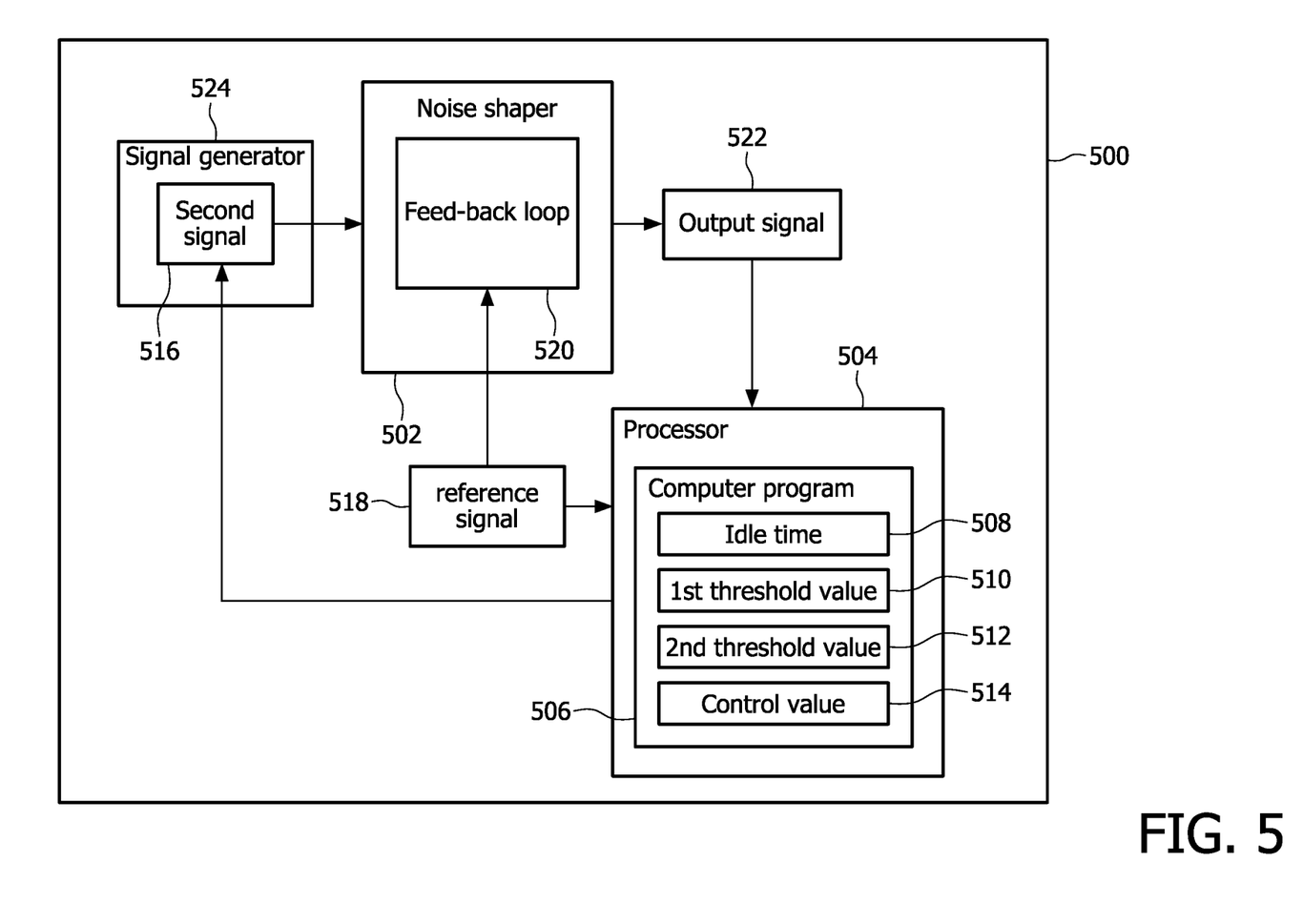
FIG. 5 shows a block diagram of a control loop used for balancing the load of a processor

FIG. 5 shows a block diagram of an electronic apparatus 500. The electronic apparatus comprises a noise shaper 502, a processor 504, and a signal generator 524. The noise shaper 502 comprises a feed-back loop 520 that is supplied with the reference signal 518. The reference signal 518 is at a fixed reference frequency. The signal generator 524 provides a second signal 516 which is fed into the input of the noise shaper 502. The noise shaper 502 generates an output signal 522 which reflects as described above the second signal 516. The output signal 522 is used to enable and to hold the processors clock frequency which is provided by the reference signal 518.

The processor 504 executes a computer program product 506 by which the idle times 508 of the processor is determined. The computer program product 506, the signal generator 524 and the noise shaper 502 form a control loop by which the processor load is controlled by a measurement of the idle times 508 of the processor 504 and by adjusting the clock frequency due to change of the second signal 516 that relates to a control value 514 which might be initially set to a start value.

A method to keep the idle times within a reasonable range is to set a first threshold vale 510 and a second threshold value 512 and then to adjust the second signal 516 via a change of the control value 514 so that the idle times 508 of the processor is between the first threshold value 510 and the second threshold value 512. If the measured idle time 508 is larger than the first threshold value 510, then the control value 514 and accordingly the second signal 516 will decreased. As an effect the first frequency which corresponds to the effective processor clock frequency that is generated by use of the first signal 522 is decreased and hence the processor's idle time 508 is decreased. The control value 514 can for example be step wise decreased until the idle time 508 lies beyond the first threshold value 510 or an optimal control value can be determined from the deviation of the idle time 508 to the first threshold value so that the appropriate first frequency can immediately be used as processor clock frequency. Similarly, the control value 514 is increased if the idle time 508 lies below a second threshold value 512 which is smaller than the first threshold value. The increase of the control value 514 leads to an increase of the second signal 516 and thus to an increase of the first frequency. Due to the increase of the first frequency, the idle time of the processor 504 is increased. The control value 514 is increased for example step wise until the idle time is larger than the second threshold value 512. It is thus ensured by the control loop that is formed by the noise shaper 502, the signal generator 524, and the computer program 506, that the idle time 508 of the processor 504 is kept between the first threshold value 510 and the second threshold value 512.

Figure 6:
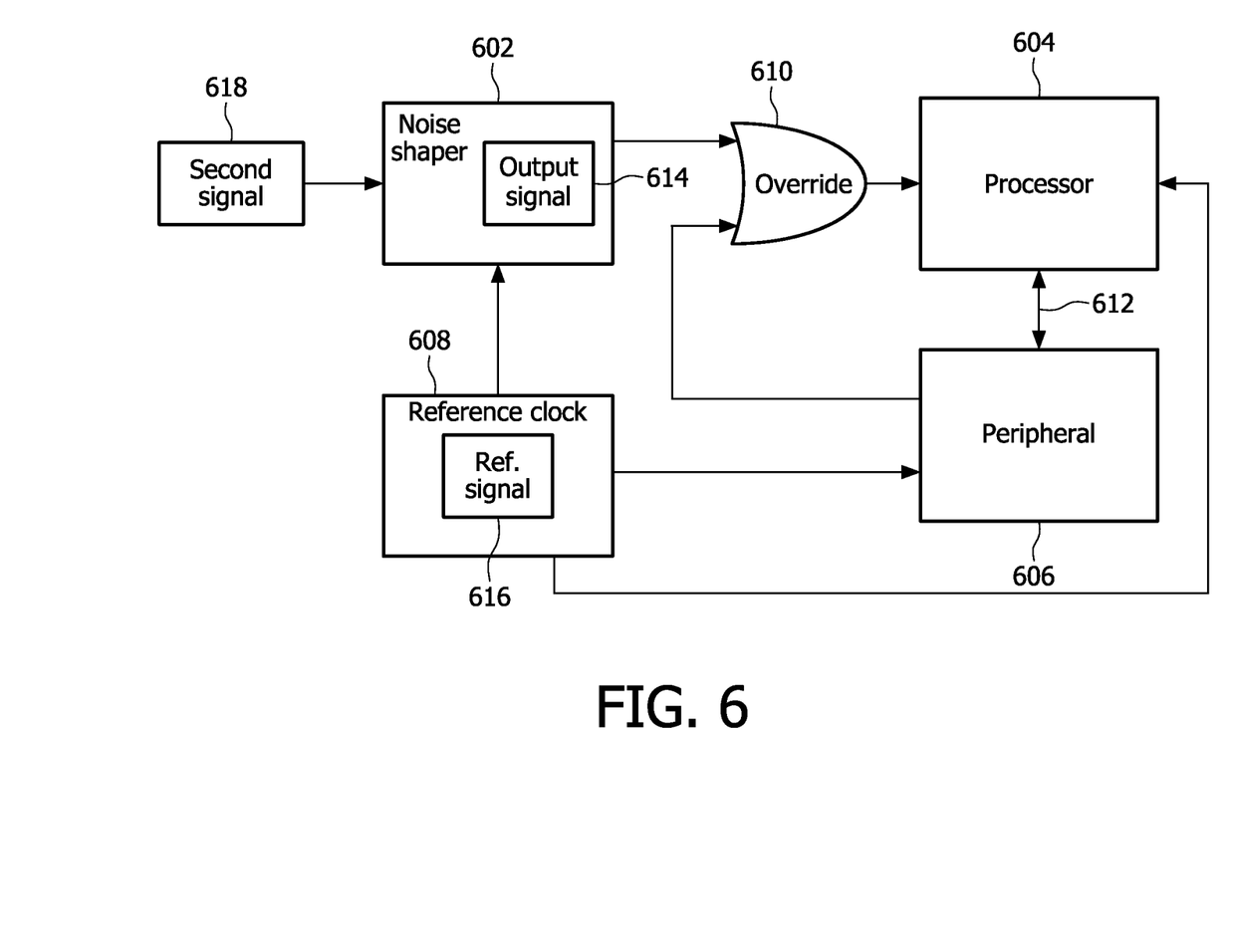
FIG. 6 depicts a block diagram illustrating how the noise shaper output can be overridden if required.

FIG. 6 depicts a block diagram illustrating how the noise shaper output can be overridden if required. FIG. 6 shows an electronic apparatus 600 that comprises a noise shaper 602, a processor 604, a peripheral device 606, a reference clock 608, and a logical override gate 610. The processor 604 and the peripheral device 606 are able to communicate via the bus 612 with each other. The reference clock 608 provides a reference signal with the reference frequency 616. The reference signal 616 is used to supply the feed-back loop of the noise shaper. The noise shaper 602 is therefore operating on the reference frequency. The input of the noise shaper is supplied with a second signal 618 that relates to a control value.

The output signal 614 is provided to one of the inputs of the logical override gate 610. The other input of the logical override gate 610 is supplied with the reference signal 616 via the peripheral device 606. The reference signal 616 is present at the input of the logical override gate 610 only when the peripheral device 606 communicates with the processor 604 while it is not present when the peripheral device 606 is inactive. The output signal 614 is thus provided via the logical override gate 610 to the processor 604 when the peripheral device 606 is inactive while the reference frequency 616 is provided to the processor while the peripheral device 606 is active. The processor 604 is clocked by the reference signal 616 which is enabled and held by the output signal 614 if the output signal is not overridden by the override 610 as described before.

The method and electronic apparatus in accordance with the invention are particularly advantageous as a first signal which is at a first frequency can be generated from a reference signal which is at a reference frequency that is larger then the first frequency by use of a noise shaper. The first frequency can be used as a clock frequency of a processor whose inactive and active cycles can be balanced by adjusting the first frequency in response to a measurement of the processors idle time.

Figure 7:
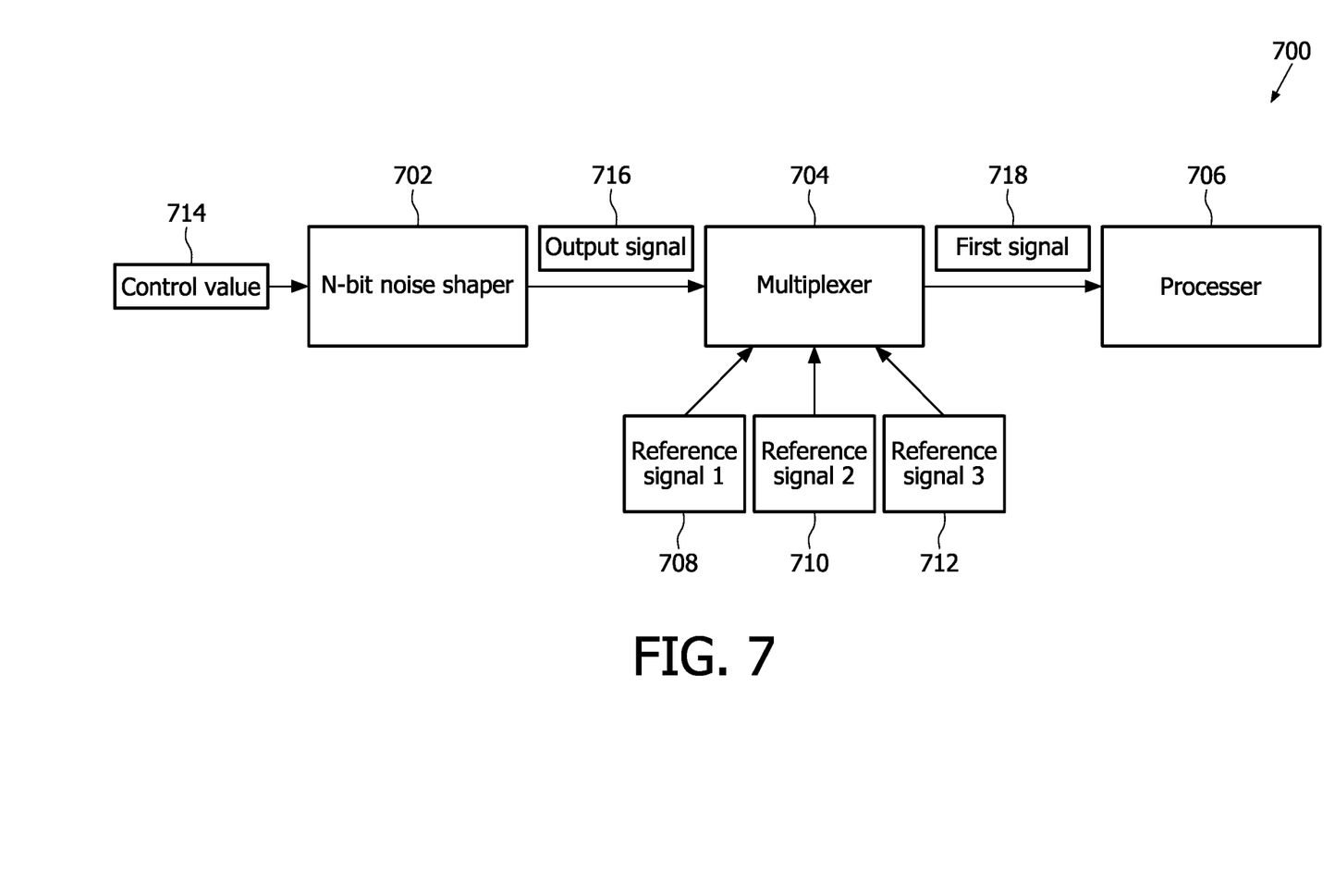
FIG. 7 shows a block diagram of another electronic apparatus.

FIG. 7 shows a block diagram of an electronic apparatus 700. The electronic apparatus 700 comprises a N-bit noise shaper 702, a multiplexer 704, and a processor 706.

The noise shaper 702 is provided with a control value 714 (or with a second signal that relates to the control value). According to the choice of the control value 714, the noise shaper 702 outputs as output signal 716 one of N different bit values, for example either "0", "1" or "2" if N=3.

The output signal 716 is fed into the multiplexer 704. The multiplexer 704 is provided with three reference signals 708, 710, and 712. Each reference signal 708, 710, 712 is assigned to one of the bit values "0", "1" or "2". The multiplexer selects the corresponding reference signal 708, 710 or 712 based on the received output signal 716, whereby a first signal 718 is obtained which corresponds to the selected reference signal. The first signal 718 is used to clock the processor 706.

Figure 8:
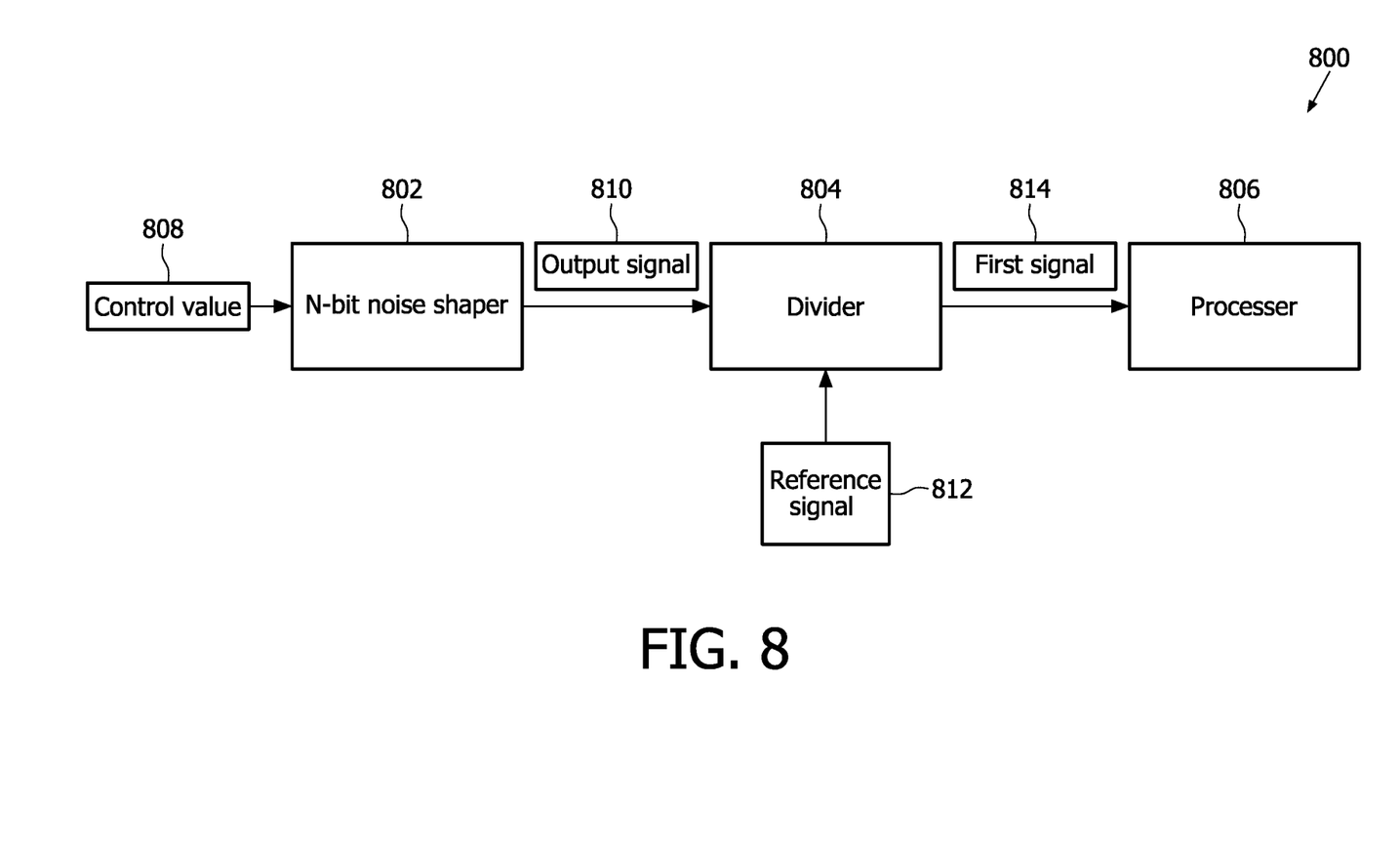
FIG. 8 shows a block diagram of yet another electronic apparatus

FIG. 8 shows a block diagram of another electronic apparatus 800. The electronic apparatus 800 comprises a N-bit noise shaper 802, a divider 804, and a processor 806. The noise shaper 802 is provided with a control value 808. According to the choice of the control value 808, the noise shaper 802 outputs as output signal 810 a sequence of bit values, wherein each bit value is in the range between, e.g., 1 and N.

The output signal 810 is fed into the divider 804. The divider 804 is provided with a reference signal 812. The divider 804 generates a first signal 814 by dividing the reference signal 812 by the bit values of the output signal 810. The first signal 814 is then used to clock the processor 806.

A method of providing a clock frequency and a corresponding electronic apparatus are disclosed herein. The first frequency which is used as processor clock frequency is generated by use of the output signal of a noise shaper. As the output signal of the noise shaper is controllable by the input signal, the first frequency can be varied and adapted via the input signal of the noise shaper. The method in accordance with the invention is particularly advantageous as the processor's clock frequency can be controlled simply be adjusting the input signal of the noise shaper.

In the subsequent claims, reference signs have been incorporated in order to facilitate an understanding of the claims. Any reference in the claims shall however not be construed as limiting the scope.

LIST OF REFERENCE NUMERALS

| | |
|---|---|
| 100 | Electronic apparatus |
| 102 | Noise shaper |
| 104 | Signal generator |
| 106 | Frequency generator |
| 108 | Microprocessor |
| 110 | Output signal |
| 112 | computer program product |
| 114 | First signal |
| 116 | First frequency |
| 118 | Reference signal |
| 120 | Reference frequency |
| 122 | Control value |
| 124 | Second signal |
| 126 | Clock gating component |
| 300 | Noise shaper |
| 302 | Input |
| 304 | Output |
| 306 | Quantizer |
| 308 | Feed-back loop |
| 400 | Electronic apparatus |
| 402 | Electronic apparatus |
| 404 | Reference signal |
| 406 | Control value |
| 408 | Bit stream |
| 410 | Override signal |
| 412 | Enabling signal |
| 414 | Processor clock signal |
| 416 | Noise shaper |
| 418 | Logical Override gate |
| 420 | Clock gating component |
| 422 | Processor |
| 424 | Reference clock |
| 426 | Processor clock |
| 500 | Electronic apparatus |
| 502 | Noise shaper |
| 504 | Processor |
| 506 | Computer program product |
| 508 | Idle time |
| 510 | First threshold |
| 512 | Second threshold |
| 514 | Control value |
| 516 | Second signal |
| 518 | Reference signal |
| 520 | Feed-back loop |
| 522 | First signal |
| 524 | Signal generator |
| 600 | Electronic apparatus |
| 602 | Noise shaper |
| 604 | Processor |
| 606 | Peripheral device |
| 608 | Reference clock |
| 610 | Logical override |
| 612 | Bus |
| 614 | Output signal |
| 616 | Reference signal |
| 618 | Second signal |
| 700 | Electronic apparatus |
| 702 | Noise shaper |
| 704 | Multiplexer |
| 706 | Processor |
| 708 | Reference signal |
| 710 | Reference signal |
| 712 | Reference signal |
| 714 | Control value |
| 716 | Output signal |
| 718 | First signal |
| 800 | Electronic apparatus |
| 802 | Noise shaper |
| 804 | Divider |
| 806 | Processor |
| 808 | Control value |
| 810 | Output signal |
| 812 | Reference signal |
| 814 | First signal |

The invention claimed is:

1. A method of providing a clock frequency to a processor, said method comprising:
   determining an actual load of said processor;
   determining a control value, the control value relating to a desired first frequency, from the deviation of said actual load to a preset target processor load
   providing at least one reference signal;
   using a second signal as input for a noise shaper, said second signal relating to said control value;
   generating a first signal having said first frequency by combining the output signal of said noise shaper with one of the at least one reference signals; and
   using said first frequency as clock frequency for said processor.

2. A method of providing a clock frequency to a processor, said method comprising:
   providing at least one reference signal;
   determining a control value, said control value relating to a desired first frequency;
   using a second signal as input for a noise shaper, said second signal relating to said control value;
   generating a first signal having said first frequency by combining the output signal of said noise shaper with one of the at least one reference signals;
   using said first frequency as clock frequency for said processor;
   determining the idle time of the processor;
   decreasing said control value if said idle time is larger than a first threshold value; and
   increasing said control value if said idle time is smaller than a second threshold value, whereby the control value is increased or decreased until the idle time is between the first and the second threshold value.

3. The method of claim 2, wherein the idle time of the processor is determined from the average of the measured idle times of subsequent processor cycles.

4. A method of providing a clock frequency to a processor, said method comprising:
   providing at least one reference signal;
   determining a control value, said control value relating to a desired first frequency;
   using a second signal as input for a noise shaper, said second signal relating to said control value;
   generating a first signal having said first frequency by combining the output signal of said noise shaper with one of the at least one reference signals;
   using said first frequency as clock frequency for said processor; and
   wherein the input range of said noise shaper is between a first input value and a second input value, wherein the first input value is larger than the second input value, wherein the second signal is set to a value which is at least approximately equal to the sum of the second input value and the product of the difference between the first and the second input value and the control value.

5. A method of providing a clock frequency to a processor, said method comprising:
   providing at least one reference signal;
   determining a control value, said control value relating to a desired first frequency;

using a second signal as input for a noise shaper, said second signal relating to said control value;
generating a first signal having said first frequency by combining the output signal of said noise shaper with one of the at least one reference signals;
using said first frequency as clock frequency for said processor;
wherein said noise shaper provides as an output signal a N-bit bit stream with a first number of different bit values, wherein said first number of reference signals is provided, wherein each reference signal of said first number of reference signals is at a different reference frequency, wherein each reference frequency is assigned to one of the first number of different bit values, wherein the first signal is generated by selecting the reference frequency according to the value of the actual bit in the output signal.

6. An electronic apparatus for providing a clock frequency to a processor, said electronic apparatus comprising:
means for determining an actual load of said processor;
means for determining a control value, relating to a desired first frequency, from the deviation of said actual load to a preset target processor load
means for providing at least one reference signal;
means for using a second signal as input for a noise shaper, said second signal relating to said control value;
means for generating a first signal having said first frequency by combing the output of said noise shaper with one of the at least one reference signals; and
means for using said first frequency as clock frequency for said processor.

7. The electronic apparatus of claim 6, wherein said means for providing at least one reference signal includes a frequency generator circuit configured and arranged to generate the at least one reference signal with a period.

8. The electronic apparatus of claim 6, wherein said means for providing at least one reference signal includes a frequency generator circuit configured and arranged to generate the at least one reference signal with a period, and wherein each of said means for determining a control value, and said means for determining an actual load of said processor, includes a processor circuit.

9. The electronic apparatus of claim 6, wherein said means for providing at least one reference signal includes a frequency generator circuit, wherein said means for using a second signal as input for a noise shaper includes a noise shaping circuit configured and arranged to receive a signal from the frequency generator circuit; wherein said means for generating a first signal having said first frequency includes a signal-gating circuit; and wherein said means for using said first frequency as clock frequency for said processor includes a portion of said processor at which a reference clock signal is received.

10. An electronic apparatus for providing a clock frequency to a processor, said electronic apparatus comprising:
means for providing at least one reference signal;
means for determining a control value, said control value relating to a desired first frequency;
means for using a second signal as input for a noise shaper, said second signal relating to said control value;
means for generating a first signal having said first frequency by combing the output of said noise shaper with one of the at least one reference signals;
means for using said first frequency as clock frequency for said processor;
said apparatus further comprising:
means for determining the idle time of the processor;
means for adjusting said control value to a value between a first threshold value and a second threshold value if said idle time is larger than said first threshold value or smaller than said second threshold value.

11. The electronic apparatus of claim 10, wherein said means for providing at least one reference signal includes a frequency generator circuit configured and arranged to generate the at least one reference signal with a period, and wherein said means for determining a control value includes a processor circuit.

12. The electronic apparatus of claim 10, wherein each of said means for determining the idle time of the processor and said means for adjusting said control value includes a processor circuit.

13. An electronic apparatus for providing a clock frequency to a processor, said electronic apparatus comprising:
means for providing at least one reference signal;
means for determining a control value, said control value relating to a desired first frequency;
means for using a second signal as input for a noise shaper, said second signal relating to said control value;
means for generating a first signal having said first frequency by combing the output of said noise shaper with one of the at least one reference signals;
means for using said first frequency as clock frequency for said processor;
means for measuring the idle time of the processor during several processor cycles; and
means for determining the idle time by averaging the measured idle times.

14. The electronic apparatus of claim 13, wherein said means for providing at least one reference signal includes a frequency generator circuit configured and arranged to generate the at least one reference signal with a period.

15. The electronic apparatus of claim 13, wherein said means for determining a control value includes a processor circuit.

16. The electronic apparatus of claim 13, wherein said means for using said first frequency as clock frequency for said processor includes a processor circuit.

17. The electronic apparatus of claim 13, wherein each of said means for measuring the idle time of the processor during several processor cycles and said means for determining the idle time by averaging the measured idle times, includes a processor circuit.

18. An electronic apparatus for providing a clock frequency to a processor, said electronic apparatus comprising:
means for providing at least one reference signal;
means for determining a control value, said control value relating to a desired first frequency;
means for using a second signal as input for a noise shaper, said second signal relating to said control value;
means for generating a first signal having said first frequency by combing the output of said noise shaper with one of the at least one reference signals;
means for using said first frequency as clock frequency for said processor; and
wherein the input range of said noise shaper is between a first input value and a second input value, wherein the first input value is larger than the second input value, wherein said second signal is adjustable to a value which is at least approximately equal to the sum of the second input value and the product of the difference between the first and the second input value and the control value.

19. A computer program product by a computer for controlling the load of a processor circuit, said computer program product comprising a non-transitory computer-readable medium storing computer executable instructions, said instructions being adapted to cause the computer to perform the steps of:

determining an actual load of said processor circuit;

determining a control value, relating to a desired first frequency, from the deviation of said actual load to a preset target processor load;

providing at least one reference signal;

using a second signal as input for a noise shaper, said second signal relating to said control value;

generating a first signal having said first frequency by combining the output signal of said noise shaper with one of the at least one reference signals; and     using said first frequency as clock frequency for said processor.

20. A computer program product by a computer for controlling an idle time of a processor circuit, said computer program product comprising a non-transitory computer-readable medium storing computer executable instructions, said instructions being adapted to cause the computer to perform the steps of:

determining the actual idle time of said processor, said processor circuit being clocked by a first frequency of a first signal, said first signal being generated by a noise shaper, wherein a feed-back loop of said noise shaper is supplied with a reference signal having a reference frequency, and wherein the input of said noise shaper is supplied with a second signal relating to a control value, said control value corresponding to the ratio of said first frequency and said reference frequency;

decreasing said control value if said idle time is larger than a first threshold value;

increasing said control value if said idle time is smaller than a second threshold value, whereby the control value is increased or decreased until the idle time lies between the first and the second threshold value.

\* \* \* \* \*